3,202,574
GUAR SEED-BORIC ACID OR -BORAX EMBALMING COMPOSITION AND METHOD

Julius F. T. Berliner, Chicago, Ill., assignor to Moser Paper Company, Chicago, Ill., a corporation of Illinois
No Drawing. Filed July 12, 1963, Ser. No. 294,740
4 Claims. (Cl. 167—49.5)

The invention relates to a composition suitable for filling cavities and, more particularly, to a cavity filling composition and method for use following autopsies in the embalming of bodies.

An object of the invention is to provide a dry, free running composition which on contact with water present in body or other cavities hardens or sets in place forming a firm, coherent gelled mass.

Another object is to provide a cavity filling composition which is highly absorbent, non-dusting, odor-less, and has germicidal value.

Another object is to provide a cavity filling composition which is completely combustible, leaving no ash.

Another object is to provide a method for filling cavities, particularly body cavities, with a dry free-flowing composition which sets to a coherent gel.

Another object is to provide a strong, coherent, cross linked galactomannan polysaccharide gel.

These and other objects and advantages are accomplished by a composition comprising hydrocolloids high in galactomannan polysaccharides with a small amount of boric acid or boric acid salt. This mixture on wetting with water forms a coherent gelled mass.

Preferably the mixture also contains insoluble inert fillers. When the mixture is in the form of a powder it may also contain a relatively non-volatile, non-aqueous liquid in an amount sufficient to substantially reduce dust formation. Additional antiseptic or germicidal agents than the boric acid or boric salt may also be present.

The composition is substantially odorless, but when paraformaldehyde or similar objectionable smelling materials are present, perfume may be added to the composition.

Suitable galactomannan polysaccharides are those present in the endosperms of the seeds of guar (*Cyamopsis tetragonobulus*) locust bean or carob (*Ceratonia siliqua*) and several other plants of the family Leguminosae. These are available as fine powders and have been used industrially as thickeners, adhesives, and clarifying agents. Recently developed polysaccharides of the galactomannan or arabinogalactan type have been produced from western larch and these may also be employed.

The presence of boric acid, borax, potassium borate, and other borates causes the galactomannan molecule to coagulate and form complex cross linked three-dimensional networks that manifest themselves as strong coherent gels.

The fillers may be inorganic, such as clay, gypsum, sand, asbestos, mica, metal powders, and the like; or where complete combustibility is essential the fillers may be organic, such as sawdust, wood flour, ground corn cobs, starch, powdered or ground nut husks, cellulose, and the like.

The use of organic fillers is preferred when combustibility and high absorption are desired.

The proportion of boric acid or boric acid salt is quite critical in that an excess will react so fast that a coherent mass will not form on contact of the composition with water. The boric acid or borate content should not exceed about 7 percent by weight of the polysaccharide and may be as low as 0.25 percent by weight and be quite effective.

Fillers are not necessary, but from a practical point of view they are very desirable. For cavity filling compositions for use in embalming of bodies, it is found that satisfactory proportions of filler to polysaccharide may vary from 20–1 to 4–1 ratios by weight.

The dust reducing liquids for use in the powdered compositions can be any liquid less volatile than water and preferably nonaqueous. Suitable liquids include glycerine, glycols such as ethylene glycol and diethylene glycol, mineral oils, vegetable oils, and animal oils.

Paraformaldehyde, formaldehyde, and any of the common antiseptic and germicidal agents used in the embalming of bodies may be present in the composition, usually in a very minor amount. Besides materials such as paraformaldehyde, compounds can be used that are termed formaldehyde donors in that on contact with proteinaceous materials or hydrolysis in the presence of moisture, yield formaldehyde. Examples of these are monomethyloldimethylhydantoin and trishydoxynitromethane.

The following example is given to illustrate the invention:

EXAMPLE I

| | | |
|---|---|---:|
| Ground corn cobs | lbs | 150.0 |
| Flour of guar seed | lbs | 20.0 |
| Borax powder | lbs | 0.5 |
| Paraformaldehyde | lbs | 5.5 |
| White mineral oil | gals | 1.0 |
| Perfume | ozs | 4 |

This is a dry, free running, dustless mixture which will readily absorb more than twice its weight in water. It is highly satisfactory for the filling of body cavities. The cavity is filled with this powder composition and due to the action of water upon it, it forms a dense plastic coherent gelled mass which on drying results in a hard, tough, strong mass.

I claim:

1. A composition for filling dead body cavities, comprising flour of guar seed, borax powder, and inert powdered filler; the proportion of filler to guar seed being from about 20–1 to 4–1, and the proportion of borax to guar seed being from about 0.25 percent to 7 percent.

2. The method of filling a body cavity which comprises filling the cavity of a dead body with a powdered composition comprising a galactomannan polysaccharide present in the endosperm of seeds of the group consisting of guar, locust, and western larch and a gel-forming amount of a substance from the group consisting of boric acid, borax and potassium borate wherein water present in the body produces a firm, coherent gelled mass.

3. A composition suitable for use in filling cavities of dead bodies, comprising flour of guar seed, a boron containing substance of the group consisting of boric acid, borax and potassium borate, and an inert powdered filler, the proportion of filler to guar seed being from about 20–1 to 4–1, and the proportion of boron containing substance to guar seed being from about 0.25 percent to 7 percent.

4. A composition suitable for use in filling cavities of dead bodies, consisting essentially of flour of guar seed, borax powder, an inert powdered filler, the proportion of filler to guar seed being about 20–1 to 4–1, and the proportion of borax to guar seed being from about 0.25 percent to 7 percent, the remainder of the composition being an antiseptic of the group consisting of formaldehyde, paraformaldehyde, and formaldehyde donors, and a liquid of the group consisting of glycerine, glycols, mineral oils, and vegetable oils.

References Cited by the Examiner

UNITED STATES PATENTS

| | | | |
|---|---|---|---|
| 2,047,323 | 7/36 | Hettel | 167—49.5 |
| 2,564,366 | 8/51 | Landan et al. | 167—49.5 |

OTHER REFERENCES

Chemical Abstracts, vol. 54, 19097g (1960).

Mendelsohn: Embalming Fluids, Chemical Publishing Co., New York, N.Y. (1940), pp. 5 and 77–79.

Strub et al.: The Principles and Practice of Embalming, L. G. Frederick, Dallas, Tex. (1959), pp. 195–203, 209–212.

Whistler: Industrial Gums, Academic Press, Inc., New York, N.Y. (1959), pp. 325 and 338–339.

JULIAN S. LEVITT, Primary Examiner.